Oct. 23, 1945.   A. R. GOLDSBY   2,387,508
CONVERSION OF HYDROCARBON OILS
Filed Sept. 2, 1942
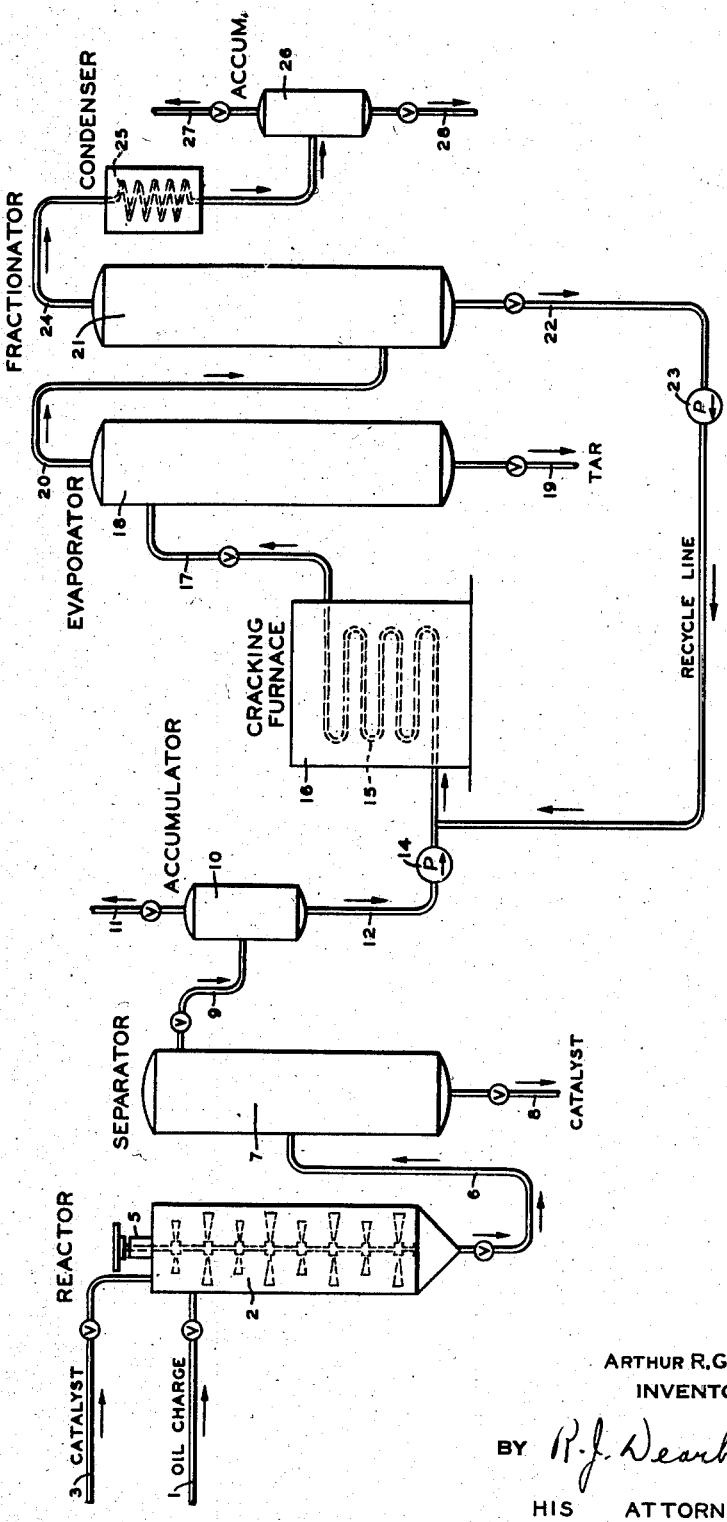
ARTHUR R. GOLDSBY
INVENTOR
BY R. J. Dearborn
HIS   ATTORNEY Patented Oct. 23, 1945

2,387,508

UNITED STATES PATENT OFFICE 2,387,508

CONVERSION OF HYDROCARBON OILS

Arthur R. Goldsby, Beacon, N. Y., assignor to The Texas Company, New York, N. Y., a corporation of Delaware Application September 2, 1942, Serial No. 456,974

5 Claims. (Cl. 196—50)

This invention relates to the conversion of hydrocarbon oils and has to do particularly with the cracking of higher boiling hydrocarbon oils into lower boiling products, such as gasoline.

More particularly, the invention comprises a process in which a virgin oil, such as a paraffinic stock essentially free of unsaturates, is treated to alter the character of the paraffin hydrocarbon constituents by isomerization or rearrangement of the structure thereof to a form which is more desirable in a cracking stock and then the treated oil is subjected to conversion whereby products of improved antiknock value are obtained.

Stocks essentially free of unsaturates and normally producing an inferior grade of gasoline may be treated, prior to cracking, with anhydrous metallic halides whereby straight chain paraffin hydrocarbon constituents thereof are isomerized to branch chain hydrocarbons of substantially the same boiling range, and the resulting product on cracking produces a cracked distillate showing a much improved antiknock value.

Hydrocarbon oils used as cracking stocks have been treated, heretofore, with metallic halides but the treatment has been such that no appreciable amount of isomerization would be obtained. Thus oils have been treated with metallic halides to obtain cracking of the oils, under high temperatures which are unsuitable for isomerization. Also oils to be cracked have been mixed at atmospheric temperatures with the metallic halides preliminary to the cracking, but the time of reaction has been insufficient to obtain isomerization and unsaturated hydrocarbons have been present in amounts which render the catalyst ineffective for isomerization.

For example, it has been proposed to treat a feed oil, prior to cracking, with an anhydrous aluminum chloride in the absence of a promoter at temperatures up to 350° F. for the purpose of removing or polymerizing unsaturated constituents, but under such conditions isomerization does not occur.

The process of the invention is preferably carried out in two steps. In the first step the virgin charging stock is isomerized by treating under proper conditions with a suitable catalyst to effect transformation of straight chain into branched chain paraffin hydrocarbons. One type of catalyst which may be used is the metallic halides. Anhydrous aluminum halides such as aluminum bromide and aluminum chloride have been found satisfactory, although other catalysts are intended to be included. The amount of catalyst used may be about 5 to 20% by weight of the oil treated, although, as indicated later, much higher proportions may be used particularly in continuous operations. The presence of a hydrogen halide is also desirable, and I prefer to use about 0.5 to 3% of hydrogen chloride or hydrogen bromide, in addition to the aluminum chloride or aluminum bromide.

The conditions for treatment with the isomerization catalyst may vary considerably and will depend on the nature of the oil. Temperatures of about 75–400° F. may be used. The higher temperatures may be used on more resistant stocks and when it is desired to speed up the reaction. I prefer, particularly with aluminum chloride, to use temperatures of about 200–275° F. The time will depend on the temperature, promoter concentration, and catalyst to oil ratios, etc. From a few minutes to several hours may be sufficient. Sufficient pressure is necessary only to keep the material in the liquid phase. For ordinary cracking stocks atmospheric pressure may be used.

At the higher temperatures, considerable gas formation may occur, but this is largely isobutane which is valuable for use in other processes, such as alkylation, dehydrogenation, etc.

In the second step the isomerized product is subjected to cracking or reforming. The cracking or reforming operations may be either thermal or catalytic and any well known or preferred method may be used. If thermal cracking is used, the conventional conditions are about 200–1000 pounds pressure and 750–1100° F. Good results are obtained at about 400 pounds and about 900° F. when cracking gas oils. For catalytic cracking the temperature and pressure conditions may be somewhat less severe. Catalysts such as aluminum chloride, solid adsorptive catalysts alone or impregnated with various metallic oxides may be used. Temperatures of about 400–1000° F. may be used and pressures from 100–750 pounds. Thermal cracking is ordinarily satisfactory although in some cases catalytic cracking, particularly with AlCl₃ at about 400–700° F. is preferable.

The drawing shows a diagrammatic sketch of one form of apparatus for carrying out the process of the invention.

Referring to the drawing, the oil to be treated is introduced through the line 1 into a reaction vessel 2. The catalyst is introduced through the line 3 as a suspension in oil or in a hydrocarbon complex. The catalyst may be charged as a mixture with the feed oil or as a solid through means other than a line, for example a funnel (not shown). In the reactor the oil is intimately contacted with the catalyst by a stirrer 5. The reaction products are transferred through the line 6 to a separator 7 wherein the catalyst is separated from the oil and discharged through the line 8. The hydrocarbons are passed through the line 9 to an accumulator 10. All or a portion of the normally gaseous hydrocarbons may be released from the accumulator through the line 11. The liquid products are withdrawn from the bottom of the accumulator through the line 12 by pump 14 and passed through the heating coil 15, located in a cracking furnace 16. The cracked products are discharged through the line 17 into an evaporator 18 wherein vapors and tar are separated. The tar is withdrawn from the bottom of the separator through the line 19. The vapors are conducted through the line 20 to a fractionator 21 and therein fractionated to separate a recycle stock of higher boiling range than gasoline which may be recycled through the line 22 by the pump 23 to the coil 15. The uncondensed vapors are led from the top of the fractionator through the line 24 and condenser 25. A gasoline condensate is collected in an accumulator 26 equipped with a gas release line 27 and a liquid draw-off line 28.

According to one method of operation the isomerization and cracking may be carried out with the same catalyst or a mixture of catalysts comprising the isomerization catalyst. For example the isomerization may be carried out at a low temperature with aluminum bromide and then the cracking operation conducted at a higher temperature with the same catalyst. When using aluminum bromide it is sometimes advantageous to separate at least a portion of the aluminum bromide for recycling, and add to the resulting product additional aluminum bromide and then subject the mixture to cracking conditions.

As an example of the operation of the invention, a virgin gas oil charging stock is mixed with about 10% aluminum bromide. The mixture is agitated for about 40 hours at a temperature of about 75° F. in the presence of hydrogen bromide. The aluminum bromide and any sludge is separated and the treated oil subjected to cracking at about 875° F. and about 600 pounds. The antiknock value of the gasoline obtained is about 2–5 points higher than ordinarily obtained without the isomerization treatment.

As another example of the operation of the invention, a virgin gas oil is agitated with 20% aluminum chloride for about 2 hours at about 250° F. in the presence of hydrogen chloride. The catalyst is separated and the treated oil subjected to thermal cracking at about 950° F. under about 400 pounds pressure. The antiknock value of the cracked gasoline is about 2 to 6 points higher than the gasoline produced by similar cracking of the gas oil which had not been given the isomerization treatment.

While the above examples relate to the cracking of virgin gas oil, it is to be understood that other oils may be used which are essentially free of unsaturates.

The invention is also applicable to the reforming of straight run naphtha, in which the naphtha is subjected to isomerization as herein described prior to subjecting the same to the reforming operation.

For example, a straight run naphtha having a boiling range of about 280 to 400° F. and an octane number of 26 is treated with 20% aluminum chloride and about 0.8% of hydrogen chloride for 3 hours at 260° F. The treated naphtha has an octane number of about 47. On subjecting the treated naphtha to thermal reforming, a gasoline may be obtained having an octane number of about 5 to 10 points higher than the gasoline obtained by reforming to a similar yield the same naphtha which has not received the preliminary isomerization treatment.

The boiling range of the feed naphtha may differ from that specified in the preceding example and thus may range from 140–450° F., for example. On the other hand the feed may be any desired fraction of straight run naphtha.

Also the isomerization step may be carried out in a continuous manner. In continuous operations the stream of naphtha hydrocarbons undergoing treatment may be passed, in the presence of hydrogen chloride, upwardly through an unpacked reaction tower filled with a comparatively stationary body of liquid catalyst, the catalyst advantageously comprising a preformed complex of aluminum chloride and hydrocarbon maintained at a temperature in the range about 100 to 250° F. and preferably not in excess of about 300 to 350° F.

The ratio of liquid catalyst to feed hydrocarbon undergoing treatment may range from about 2 to 100 volumes of liquid catalyst per volume of naphtha hydrocarbon within the tower. It is desirable to maintain the feed hydrocarbons in the form of highly dispersed particles or droplets during passage through the catalyst liquid, the drop velocity ranging from about 0.1 to 0.2 or 0.5 ft. per second through the liquid catalyst.

Advantageously, the preformed liquid complex compound of aluminum chloride and hydrocarbon is of such character that when a minor portion of complex is mixed with a major portion of water the heat evolved from the mixture amounts to about 200 to 400 calories per gram of complex. The heat of the mixture is determined by breaking an ampoule containing a weighed amount of complex, i. e., about 3 grams in a weighed quantity of water, i. e., about 300 grams contained in a thermos flask and initially at about normal room temperature. The mixture is stirred and the rise in temperature is measured. The heat liberated is calculated as calories per gram of complex.

In the isomerization treatment individual feed hydrocarbons are converted into isomers having the same number of carbon atoms per molecule. It is advantageous to effect the conversion without substantial formation of hydrocarbons having either a smaller or a greater number of carbon atoms per molecule including hydrocarbon compounds which, during the subsequent reforming treatment, would form compounds of low octane value or else which would be readily decomposed into carbonaceous or other undesirable material the presence of which would be objectionable particularly where a catalyst is used in the reforming step.

The resulting isomerized naphtha is then subjected to reforming by thermal treatment at cracking temperatures in the range 800 or 900 to 1000° F. This reforming treatment may be effected in the presence of a catalyst and may be effected with a dehydrogenating catalyst in the presence of hydrogen at temperatures in the foregoing temperature range. The reformed naphtha may be subjected to fractionation as already described in connection with the method of flow illustrated in the drawing.

The advantages of the present invention appear to be due to the formation, in the isomerization step, of branched chain compounds which on cracking yield high antiknock products. However, the invention is not dependent on any theory of reaction, the important thing being that by increasing the branched chain character of the feed to the reforming reaction, a substantial improvement results in the quality of the reformed product.

The advantage of increasing the branched chain character of the naphtha feed prior to reforming by thermal treatment is evidenced further by comparing the quality of gasoline produced by catalytically treating under similar conditions of elevated temperature a heavy straight run naphtha and a more highly branched chain naphtha of substantially similar boiling range, the more highly branched chain naphtha being a high boiling fraction segregated from the product produced by alkylating a low boiling isoparaffin with normally gaseous olefins. The two feed naphthas are of the following character:

|  | A, heavy straight-run naphtha | B, highly branched chain naphtha |
|---|---|---|
| Gravity A. P. I. | 39.3 | 55.2 |
| Initial boiling point, °F | 318 | 330 |
| 50% boiling point, °F | 342 | 364 |
| End boiling point, °F | 392 | 398 |
| Octane, CFRM | 68.9 | 78.3 |

These two stocks were separately subjected to catalytic cracking in the vapor phase at a temperature of about 850° F. and under a pressure of about 35 pounds per square inch gauge, other operating conditions being maintained substantially similar in both cases. The cracked product in each case was analyzed and found to have the following composition:

| Per cent composition by volume | A | B |
|---|---|---|
| Debutanized light naphtha boiling up to about 300° F. | 13.06 | 19.54 |
| Heavy naphtha boiling over the range 300 to 400° F. | 78.82 | 70.26 |
| Gas oil | 1.83 | 0.07 |
| C₄ fraction | 7.44 | 10.85 |

| Per cent composition by weight | A | B |
|---|---|---|
| Gas (C₃ and lighter) | 2.43 | 3.28 |
| Octanes, CFRM: | | |
| Light naphtha | 80.3 | 84 |
| Heavy naphtha | 71.4 | 79.8 |

Thus, as indicated by the foregoing, the reforming treatment at cracking temperatures of a feed naphtha which is initially of higher branched chain character results in the production of reformed naphtha hydrocarbons having materially greater octane value. Moreover the yield of the light naphtha fraction is substantially higher.

Accordingly, a modification of the invention involves reforming a synthetic naphtha of highly branched chain character prepared by alkylating olefins with paraffins. Normally gaseous olefins and low boiling normally liquid olefins may be reacted with a low boiling isoparaffin such as isobutane in the presence of an alkylation catalyst such as concentrated sulfuric acid, anhydrous hydrogen fluoride, or aluminum halide-hydrogen halide to produce a product comprising highly branched chain hydrocarbons boiling within the naphtha range. The high fraction or fractions of this product may be subjected to reforming as above described. Residual $C_4$ and lighter hydrocarbons from the reforming treatment, such as olefins and isoparaffins may be recycled to the alkylation reaction. Residual and other hydrocarbons may be recycled to the reforming operation.

A synthetic naphtha also may be made by polymerization with subsequent hydrogenation of the polymer naphtha or any fraction thereof.

While mention has been made of isomerizing straight chain hydrocarbon constituents of the feed, nevertheless it is contemplated that other hydrocarbon constituents of naphtha such as naphthenes also may be isomerized and then reformed in the subsequent thermal or catalytic conversion treatment.

Reference has been made previously to effecting isomerization with a preformed complex of aluminum halide and hydrocarbon. However, the catalyst may comprise complex formed during continued operation. Complex will form during the reaction and some complex may be withdrawn from the system from time to time. Aluminum halide may be added from time to time or continuously in small amount to maintain a complex catalyst having the previously described heat of hydrolysis characteristic.

The reforming may be effected in the presence of dehydrogenating catalysts such as chromia-alumina and molybdena-alumina.

This application is a continuation-in-part of my pending application, Serial No. 316,464, filed January 31, 1940, now Patent No. 2,297,617 dated September 29, 1942, which in turn is a continuation-in-part of my application Serial No. 151,173, filed June 30, 1937.

Obviously many modifications and variations of the invention, as hereinbefore set forth, may be made without departing from the spirit and scope thereof, and therefore only such limitations should be imposed as are indicated in the appended claims.

I claim:

1. A process for the manufacture of high antiknock gasoline hydrocarbons which comprises subjecting straight-run naphtha, in the substantial absence of unsaturated hydrocarbons, to the action of an aluminum halide isomerization catalyst in the presence of a small amount of hydrogen halide at an elevated temperature up to about 275° F. such that naphtha hydrocarbons are converted into isomers without substantial formation of hydrocarbons having either an increased or a decreased number of carbon atoms per molecule, removing the isomerized naphtha hydrocarbon product from further contact with the isomerization catalyst, and then subjecting said removed product to reforming by exposing to contact with a cracking catalyst at temperatures in the range 800 to 1000° F. whereby substantial conversion into high antiknock gasoline hydrocarbons is obtained.

2. A process for the manufacture of high antiknock gasoline hydrocarbons which comprises subjecting normally liquid naphtha hydrocarbons, in the substantial absence of unsaturated hydrocarbons, to the action of an aluminum halide isomerization catalyst in the presence of a small amount of hydrogen halide at an elevated temperature up to about 275° F. such that substantial conversion of said naphtha hydrocarbons into normally liquid isomers occurs without substantial formation of hydrocarbons having either an increased or a decreased number of carbon atoms per molecule, removing the resulting hydrocarbon product from further contact with the isomerization catalyst and then subjecting said removed product to contact with a solid adsorptive cracking catalyst impregnated with metallic oxide at a temperature in the range of about 800 to 1000° F. whereby substantial conversion into high anti-knock gasoline hydrocarbons is obtained.

3. The process which comprises subjecting a normally liquid saturated naphtha hydrocarbon in the substantial absence of unsaturated hydrocarbons to the action of an aluminum halide isomerization catalyst in the presence of a small amount of hydrogen halide at an elevated temperature up to about 275° F. such that substantial isomerization to normally liquid naphtha hydrocarbon occurs without substantial formation of hydrocarbons having either an increased or a decreased number of carbon atoms per molecule and separately subjecting the resulting isomerized product to reforming by contact with solid adsorptive cracking catalyst at a temperature in the range 800 to 1000° F. whereby substantial conversion to isomerized hydrocarbons occurs.

4. A process for the manufacture of high anti-knock gasoline hydrocarbons which comprises subjecting straight run naphtha, in the substantial absence of unsaturated hydrocarbons, to the action of an aluminum halide isomerization catalyst in the presence of a small amount of hydrogen halide at an elevated temperature up to about 275° F. such that naphtha hydrocarbons are converted into isomers without substantial formation of hydrocarbons having either an increased or a decreased number of carbon atoms per molecule, removing the isomerized naphtha hydrocarbon product from further contact with the isomerization catalyst and then subjecting said removed product to reforming by exposing to contact with a solid adsorptive catalyst containing metallic oxide at temperatures in the range about 750 to 1100° F. whereby substantial conversion into high anti-knock gasoline hydrocarbons is obtained.

5. A process for the manufacture of high anti-knock gasoline hydrocarbons which comprises subjecting straight-run naphtha, in the substantial absence of unsaturated hydrocarbons, to the action of a metallic halide isomerization catalyst in the presence of a small amount of hydrogen halide at an elevated temperature up to about 275° F. such that naphtha hydrocarbons are converted into isomers without substantial formation of hydrocarbons having either an increased or a decreased number of carbon atoms per molecule, removing the isomerized naphtha hydrocarbon product from further contact with the isomerization catalyst and then subjecting said removed product to reforming by exposing to contact with a solid adsorptive catalyst containing metallic oxide at temperatures in the range about 750 to 1100° F. whereby substantial conversion into high anti-knock gasoline hydrocarbons is obtained.

ARTHUR R. GOLDSBY.